J. WILL.
Lunch-Case.
No. 206,287. Patented July 23, 1878.
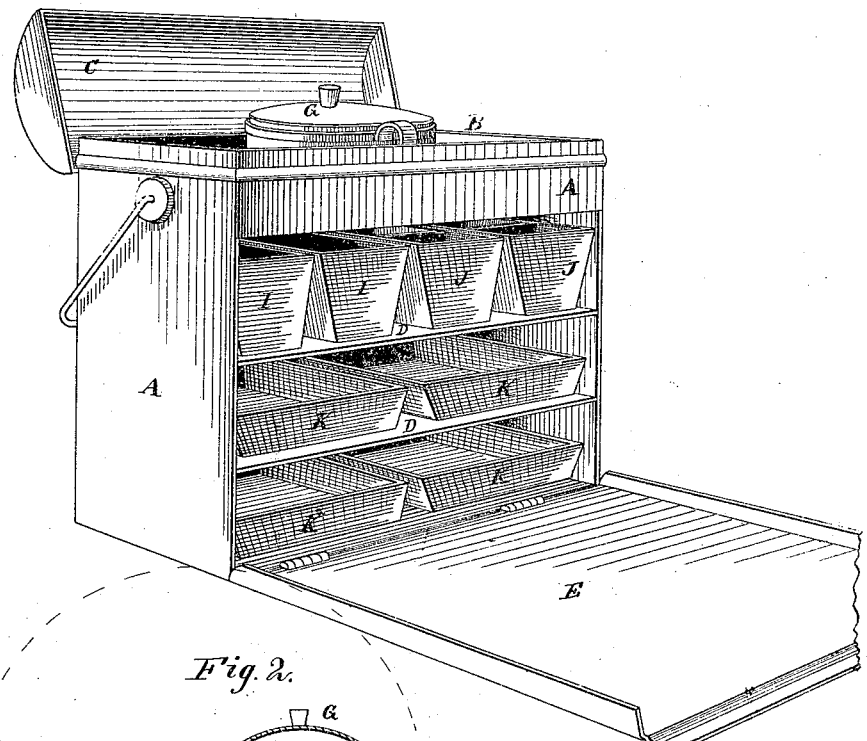
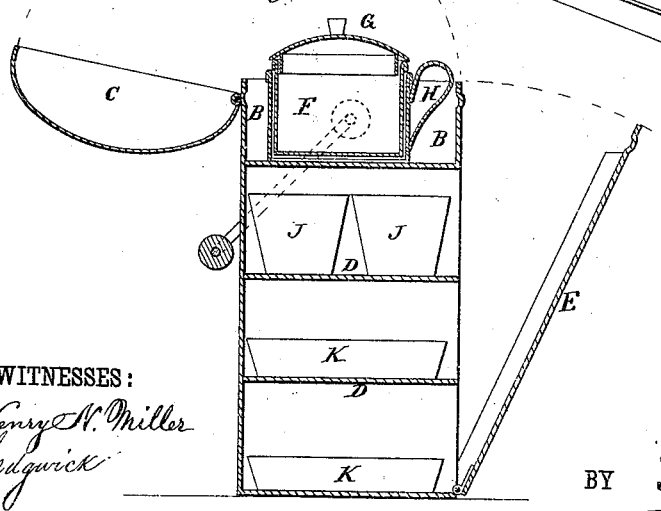

UNITED STATES PATENT OFFICE.

JOHN WILL, OF BRYAN, OHIO.

IMPROVEMENT IN LUNCH-CASES.

Specification forming part of Letters Patent No. 206,287, dated July 23, 1878; application filed May 23, 1878.

*To all whom it may concern:*

Be it known that I, JOHN WILL, of Bryan, in the county of Williams and State of Ohio, have invented a new and useful Improvement in Lunch-Cases, of which the following is a specification:

In the accompanying drawings, forming part hereof, Figure 1 is a perspective view of my improved lunch-case, shown open. Fig. 2 is a vertical cross-section of the same.

Similar letters of reference indicate corresponding parts.

The object of this invention is to furnish an improved lunch-case for the use of laborers and others, whose employment requires them to carry lunch with them, and for the use of picnic-parties, fishing-parties, excursionists, &c., and which shall be simple in construction and convenient in use, carrying the lunch securely, and protecting it from dust or other impurities.

A represents my improved lunch-case, which is made with a chamber, B, in its upper part, to receive bread, the drinking-cups, &c. The chamber B is closed by a cover, C, hinged at its rear edge to the top edge of the case A. The part of the case below the chamber B is made open in front, and is provided with shelves D. The open front of the lower part of the case A is closed by the front plate E, which is hinged at its lower edge to the lower front edge of the case A. The side edges of the hinged front E are bent inward to overlap the ends of the case A, and thus tightly close the open front of the said case. The upper part of the hinged front E projects along and fits upon the front of the upper part of the case A, so that when closed it may be overlapped and held in place by the forward part of the cover C, which shuts down over it.

F are the drinking-cups, the inner one of which is provided with a closely-fitting cover, G, and the outer one of which is provided with a handle, H. The cups F are made of such a size that the inner cup will fit snugly into the outer cup, as shown in Fig. 2. The inner cup is designed to receive and carry tea, coffee, milk, or other liquid, and the outer cup, F, is designed to be used for drinking purposes.

I are fruit or vegetable dishes, two or more of which may be used, and which are made of a length equal to the width of the case A, so that they may be held securely in place.

J are sauce-cups, four, more or less, of which may be used, and which are made of such a size that two of them may equal in width the width of the case A. The dishes I and cups J are made of such a width as to fill up the length of the case A, so that the said dishes and cups will be kept from shaking about when being carried.

K are pans for tarts, pies, cakes, &c., which are made of such a size as to fit snugly into the space of the case A and be prevented from shaking about while being carried. The pans K are so formed that they may be used as baking-pans for cooking their contents before putting them in the case A.

When used at a picnic the lunch-cases may be placed in line along the center of the table, and will furnish the guests with sufficient refreshment, the guests helping themselves from the case or cases opposite them, thus saving a great deal of labor and confusion in preparing the tables, taking care of the provisions, &c.

Having thus described my invention, I claim as new and desire to secure by Letters Patent—

The combination, with a cover, of a hinged front piece, the latter, when closed, overlapping the sides, and the former overlapping the whole top portion, substantially as shown and described.

JOHN WILL.

Witnesses:
 JACOB YOUSE,
 CHARLES ALEXANDER BOWERSOE.